(12) United States Patent
Zettel et al.

(10) Patent No.: US 7,544,151 B2
(45) Date of Patent: Jun. 9, 2009

(54) METHOD AND APPARATUS TO MONITOR OPERATION OF AN AUXILIARY HYDRAULIC PUMP IN A TRANSMISSION

(75) Inventors: Andrew M. Zettel, Ann Arbor, MI (US); Peter E. Wu, Brighton, MI (US); Rick H. Schroeder, Lapeer, MI (US); Michael J. Taljonick, Davison, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 449 days.

(21) Appl. No.: 11/531,502

(22) Filed: Sep. 13, 2006

(65) Prior Publication Data

US 2008/0064562 A1    Mar. 13, 2008

(51) Int. Cl.
*F16H 61/38* (2006.01)
(52) U.S. Cl. .................. 477/160; 477/157; 477/164
(58) Field of Classification Search .................. 477/156, 477/157, 158, 160, 164
See application file for complete search history.

(56) References Cited

U.S. PATENT DOCUMENTS

| | | | | |
|---|---|---|---|---|
| 4,864,823 A * | 9/1989 | Ikejiri et al. | ................... | 60/488 |
| 7,073,328 B2 * | 7/2006 | Knoblauch | ................... | 60/368 |
| 7,288,039 B2 * | 10/2007 | Foster et al. | ................... | 475/5 |

FOREIGN PATENT DOCUMENTS

JP    01199004 A  *  8/1989

\* cited by examiner

*Primary Examiner*—Ha D. Ho

(57) ABSTRACT

A method and apparatus to monitor operation of an electrically-actuated hydraulic pump selectively operative to supply pressurized fluid to a hydraulic circuit for a transmission device operably connected to an internal combustion engine of a vehicle includes monitoring vehicle operation and passively and intrusively monitoring hydraulic circuit pressure. The hydraulic pump is functioning properly when the monitored pressure in the hydraulic circuit exceeds a threshold. A fault related to the hydraulic circuit is identified when the monitored pressure in the hydraulic circuit does not exceed the threshold.

17 Claims, 3 Drawing Sheets

//METHOD AND APPARATUS TO MONITOR OPERATION OF AN AUXILIARY HYDRAULIC PUMP IN A TRANSMISSION

TECHNICAL FIELD

This invention pertains generally to control of a transmission device, and more specifically to a monitoring system for an auxiliary hydraulic pump of the transmission device.

BACKGROUND OF THE INVENTION

A hybrid powertrain system typically includes torque-generative devices which provide motive torque to a transmission device to control torque and speed output to a driveline. The torque-generative devices typically comprise an internal combustion engine and electric machines. An exemplary hybrid powertrain includes a two-mode, compound-split, electro-mechanical transmission operative to receive torque input from the torque-generative devices. Management of the torque inputs to achieve an output includes selective actuation of torque-transfer devices, or clutches, of the transmission. Actuation of each clutch is effected via selectively applied hydraulic pressure from a hydraulic circuit. Pressurized fluid through the hydraulic circuit is typically supplied from a hydraulic pump that is driven off of an input shaft from the internal combustion engine.

A second, electrically-driven hydraulic pump can be selectively operated to supply pressurized fluid to the hydraulic circuit as required. By way of example, a vehicle employing a hybrid powertrain reduces fuel consumption and improves fuel economy by selectively shutting off the internal combustion engine under specific operating conditions, e.g. when the vehicle is stopped at a stoplight, or coasting. Under such conditions, the engine-driven hydraulic pump is inoperative and unable to maintain fluidic pressure in the hydraulic circuit. An applied torque-transfer clutch may deactivate due to leak down of hydraulic pressure. Engineers have addressed the issue of leak down of hydraulic pressure during engine shutoff events by mechanizing systems with the aforementioned electrically-driven auxiliary hydraulic pump to supply hydraulic pressure to the torque-transfer clutches during such events.

A fault occurring in a system employing an electrically-driven auxiliary hydraulic pump leads to the hybrid system not operating as intended, resulting in customer dissatisfaction. Furthermore, federal and state regulations impose requirements to monitor operation of such pumps, including diagnosing presence of a fault and informing a vehicle operator of the presence of the fault, under specifically regulated conditions. System elements requiring monitoring can include sensing devices, actuators, electric motors, and electrical circuits. Monitoring conditions can include presence of open or short circuits, out-of-range/rationality checking, and proper functional response to inputs. Therefore, there is a need for a control system to monitor operation of an electrically-driven auxiliary hydraulic pump and system.

SUMMARY OF THE INVENTION

Therefore, in accordance with an embodiment of the invention, there is provided a method and apparatus to monitor operation of an electrically-actuated hydraulic pump selectively operative to supply pressurized fluid to a hydraulic circuit for a transmission device operatively connected to an internal combustion engine of a vehicle. The method comprises monitoring operation of the vehicle, including monitoring a temperature of the pressurized fluid, an elapsed time, a position of an ignition switch, and, a presence of diagnostic codes. The method includes passively monitoring a pressure in the hydraulic circuit and intrusively monitoring the pressure in the hydraulic circuit. The control system and method are operative to determine the hydraulic pump is functioning properly when the monitored pressure in the hydraulic circuit exceeds a threshold.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF EMBODIMENTS OF THE INVENTION

Figure 1:
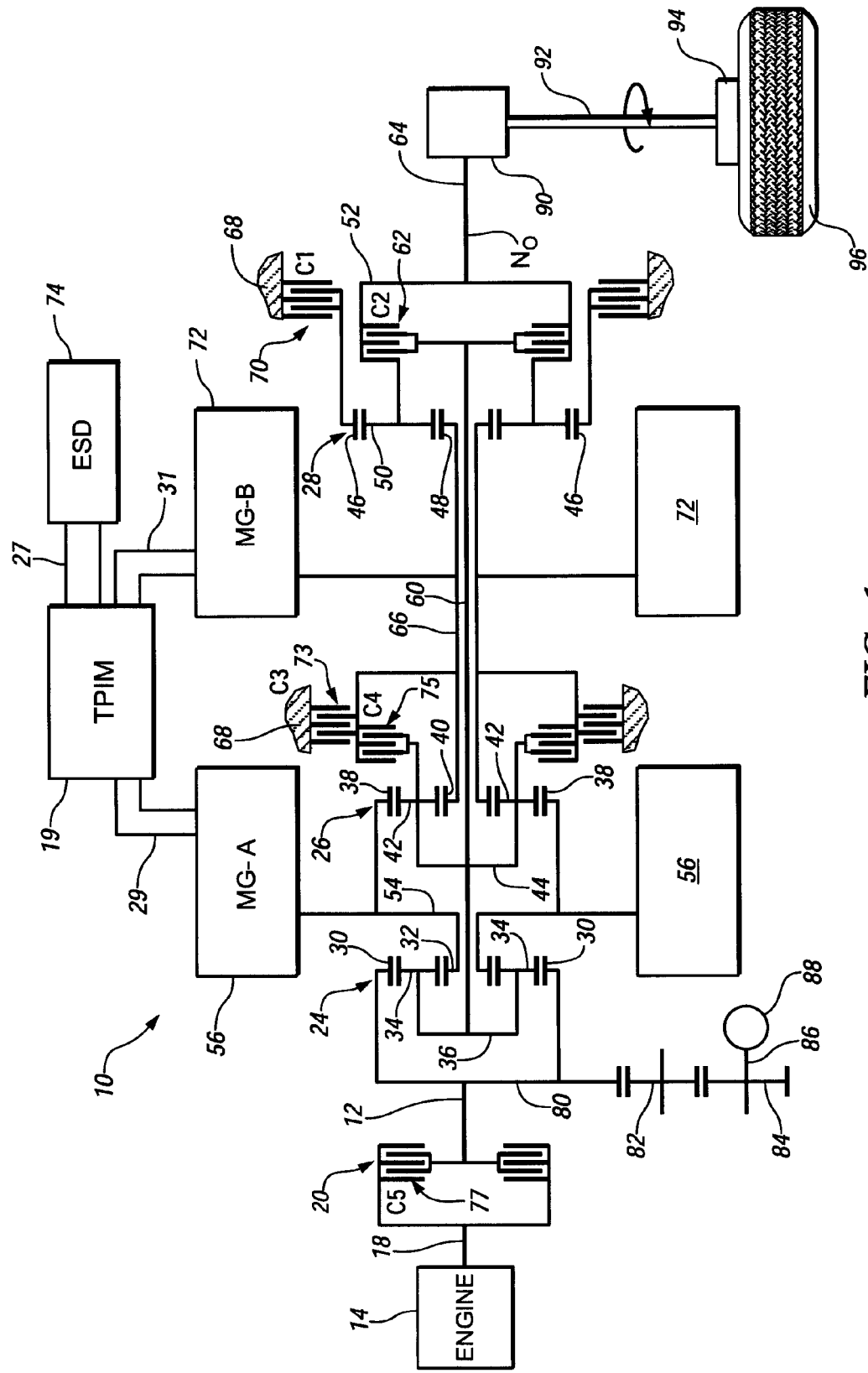
FIG. 1 is a schematic diagram of an exemplary powertrain, in accordance with the present invention.
Figure 2:
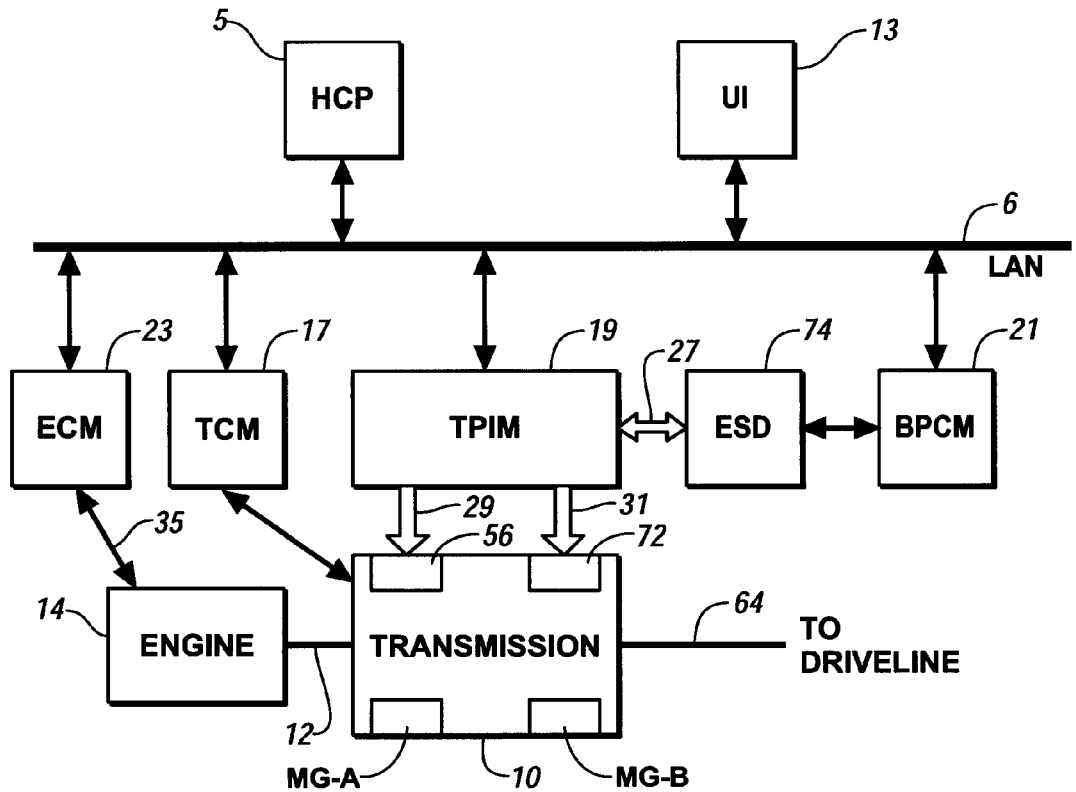
FIG. 2 is a schematic diagram of an exemplary control architecture and powertrain, in accordance with the present invention.

Referring now to the drawings, wherein the showings are for the purpose of illustrating the invention only and not for the purpose of limiting the same, FIGS. 1 and 2 show a system comprising an engine 14, transmission 10, control system, and driveline which has been constructed in accordance with an embodiment of the present invention.

Mechanical aspects of exemplary transmission 10 are disclosed in detail in commonly assigned U.S. Patent Application Publication No. U.S. 2005/0137042 A1, published Jun. 23, 2005, entitled Two-Mode, Compound-Split, Hybrid Electro-Mechanical Transmission having Four Fixed Ratios, which is incorporated herein by reference. The exemplary two-mode, compound-split, electromechanical transmission embodying the concepts of the present invention is depicted in FIG. 1. The transmission 10 has an input shaft 12 preferably directly driven by engine 14. A transient torque damper 20 is incorporated between the output shaft 18 of the engine 14 and the input member 12 of the transmission 10. The transient torque damper 20 preferably comprises a torque transfer device 77 having characteristics of a damping mechanism and a spring. The transient torque damper 20 permits selective engagement of the engine 14 with the transmission 10. The torque transfer device 77 is not utilized to change, or control, the mode in which the transmission 10 operates. The torque transfer device 77 preferably comprises a hydraulically operated friction clutch, referred to as clutch C5.

The engine 14 can be any of numerous forms of internal combustion engines, such as a spark-ignition engine or a compression-ignition engine, readily adaptable to provide a torque output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the transmission 10 utilizes three planetary-gear sets 24, 26 and 28. The first planetary gear set 24 has an outer ring gear member 30 which circumscribes an inner, or sun gear member 32. A plurality of planetary gear members 34 are rotatably mounted on a carrier 36 such that each planetary gear member 34 meshingly engages both the outer gear member 30 and the inner gear member 32. Planetary gear set 24 meshingly engages accessory gear 82, which meshingly engages gear 84 which drives shaft 86 which is operatively connected to hydraulic pump 88. Hydraulic pump 88 is a known device preferably sized to supply hydraulic fluid to a hydraulic circuit (142 in FIG. 3) of the transmission at pressure/flow rates sufficient to meet system requirements, including pressure levels for clutch actuation, and flow rates sufficient to meet needs for system cooling and lubrication. Further details of the exemplary hydraulic circuit are depicted with reference to FIG. 3, described hereinbelow.

The second planetary gear set 26 has an outer ring gear member 38, which circumscribes an inner sun gear member 40. A plurality of planetary gear members 42 are rotatably mounted on a carrier 44 such that each planetary gear 42 meshingly engages both the outer gear member 38 and the inner gear member 40.

The third planetary gear set 28 has an outer ring gear member 46, which circumscribes an inner sun gear member 48. A plurality of planetary gear members 50 are rotatably mounted on a carrier 52 such that each planetary gear 50 meshingly engages both the outer gear member 46 and the inner gear member 48.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined through a hub plate gear 54 to the outer gear member 38 of the second planetary gear set 26. The conjoined inner gear member 32 of the first planetary gear set 24 and the outer gear member 38 of the second planetary gear set 26 are continuously connected to a first electrical machine comprising a motor/generator 56, also referred to as "MG-A".

The planetary gear sets 24 and 26 are further compounded in that the carrier 36 of the first planetary gear set 24 is conjoined through a shaft 60 to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through a torque transfer device, or clutch C2 62. The carrier 52 of the third planetary gear set 28 is connected directly to the transmission output member 64.

In the embodiment described herein, the transmission 10 is preferably used in a land vehicle, wherein the output member 64 is operably connected to a driveline comprising a gear box 90 or other torque transfer device which provides a torque output to one or more vehicular axles 92 or half-shafts (not depicted). The axles 92, in turn, terminate in drive members 96. The drive members 96 can be either front or rear wheels of the vehicle on which they are employed. The drive members 96 may have some form of wheel brake 94 associated therewith.

The inner gear member 40 of the second planetary gear set 26 is connected to the inner gear member 48 of the third planetary gear set 28, through a sleeve shaft 66 that circumscribes shaft 60. The outer gear member 46 of the third planetary gear set 28 is selectively connected to ground, represented by the transmission housing 68, through a torque transfer device or clutch C1 70. The sleeve shaft 66 is also continuously connected to a second electrical machine comprising a motor/generator 72, referred to as MG-B.

A torque transfer device or clutch C3 73 selectively connects the sun gear 40 with ground, i.e., with transmission housing 68. A torque transfer device or clutch C4 75 is operative as a lock-up clutch, locking planetary gear sets 24, 26, electrical machines 56, 72 and the input to rotate as a group, by selectively connecting the sun gear 40 with the carrier 44. The torque transfer devices C2 62, C1 70, C3 73, and C4 75 are all preferably friction clutches hydraulically actuated through the hydraulic circuit 142 (See FIG. 3).

The transmission 10 receives input motive torque from the torque-generative devices, including the engine 14 and the electrical machines 56 and 72, as a result of energy conversion from fuel or electrical potential stored in an electrical energy storage device (ESD) 74.

The ESD 74 is high voltage DC-coupled to transmission power inverter module (TPIM) 19 via DC lines or transfer conductors 27. The TPIM 19 is an element of the control system described hereinafter with regard to FIG. 2. The TPIM 19 communicates with the first electrical machine 56 by transfer conductors 29, and the TPIM 19 similarly communicates with the second electrical machine 72 by transfer conductors 31. Electrical current is transferable to or from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality.

In motoring control, the respective inverter receives current from the DC lines and provides AC current to the respective electrical machine, i.e. MG-A and MG-B, over transfer conductors 29 and 31. In regeneration control, the respective inverter receives AC current from the electrical machine over transfer conductors 29 and 31 and provides current to the DC lines 27. The net DC current provided to or from the inverters determines the charge or discharge operating mode of the electrical energy storage device 74. Preferably, MG-A 56 and MG-B 72 are three-phase AC machines and the inverters comprise complementary three-phase power electronics.

Referring now to FIG. 2, a schematic block diagram of the control system, comprising distributed control module architecture, is depicted. The elements described hereinafter comprise a subset of overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and TPIM 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain, including the transmission 10. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an engine torque command, clutch torque commands, $T_{CL\_N}$ for the various clutches C1, C2, C3, C4 of the transmission 10; and motor torque commands, $T_A$ and $T_B$, for MG-A and MG-B, respectively. The HCP determines when to start and stop the internal combustion engine 14, based upon operating conditions, battery conditions, and user demands for torque input through the UI 13.

The ECM 23 is operably connected to the engine 14, and functions to acquire data from a variety of sensors and control a variety of actuators, respectively, of the engine 14 over a plurality of discrete lines collectively depicted as aggregate line 35. For simplicity, ECM 23 is depicted generally having bi-directional interface with engine 14 via aggregate line 35. Various other parameters that are sensed by ECM 23 include engine coolant temperature, engine input speed ($N_I$) to shaft 12 leading to the transmission, manifold pressure, ambient air temperature, and ambient pressure. Various actuators that are controlled by the ECM 23 include fuel injectors, ignition modules, and throttle control modules. Engine operation by the ECM 23 includes capability to stop and start engine operation during ongoing vehicle operation. The ECM 23 preferably receives commands to start and stop the engine from the HCP 5.

The TCM 17 is operably connected to the transmission 10 and functions to acquire data from a variety of sensors and provide command signals to the transmission. Outputs from the HCP 5 to the TCM include commands for actuation or deactivation of each of the clutches C1, C2, C3, and, C4 and rotational speed, $N_O$, of the output shaft 64. The TCM is operable to monitor various pressure sensing devices (not depicted) in the hydraulic circuit of the transmission, and generate and execute control signals for controlling various pressure control solenoids, some of which are depicted schematically with reference to FIG. 3.

The BPCM 21 is signally connected one or more sensors operable to monitor electrical current or voltage parameters of the ESD 74 to provide information about the state of the batteries to the HCP 5. Such information includes battery state-of-charge, battery voltage, $V_{BAT}$, and available battery power, $P_{BAT\_MIN}$ and $P_{BAT\_MAX}$.

The TPIM 19 includes a pair of power inverters and motor control modules configured to receive motor control commands and control inverter states therefrom to provide motor drive or regeneration functionality. The TPIM 19 is operable to generate torque commands for MG-A 56 and MG-B 72, $T_A$ and $T_B$, based upon input from the HCP 5, which is driven by operator input through UI 13 and system operating parameters. The electrical energy storage device 74 is high-voltage DC-coupled to the TPIM 19 via DC lines 27. Electrical current is transferable to or from the TPIM 19 in accordance with whether the ESD 74 is being charged or discharged. The TPIM 19 determines and communicates operating temperatures of MG-A and MB-B to the HCP 5, preferably using on-board temperature sensors (not depicted). The TPIM 19 is operatively coupled to a control device for an auxiliary hydraulic pump 110, referred to as TAOP 130.

Each of the aforementioned control modules is preferably a general-purpose digital computer generally comprising a microprocessor or central processing unit, storage mediums comprising read only memory (ROM), random access memory (RAM), electrically programmable read only memory (EPROM), a high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In response to an operator's action, as captured by the UI 13, the supervisory HCP control module 5 and one or more of the other control modules determine required transmission output torque, $T_O$ at shaft 64. Selectively operated components of the transmission 10 are appropriately controlled and manipulated to respond to the operator demand. For example, in the exemplary embodiment depicted in FIGS. 1 and 2, when the operator has selected a forward drive range and manipulates either the accelerator pedal or the brake pedal, the HCP 5 determines an output torque for the transmission, $T_O$, which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electromechanical transmission, includes output member 64 which receives output power through two distinct gear trains within the transmission 10, and operates in several transmission operating modes, described with reference now to FIG. 1, and Table 1, below.

TABLE 1

| Transmission Operating Mode | Actuated Clutches | |
| --- | --- | --- |
| Mode I | C1 70 | |
| Fixed Ratio 1 (GR1) | C1 70 | C4 75 |
| Fixed Ratio 2 (GR2) | C1 70 | C2 62 |
| Mode II | C2 62 | |
| Fixed Ratio 3 (GR3) | C2 62 | C4 75 |
| Fixed Ratio 4 (GR4) | C2 62 | C3 73 |

The various transmission operating modes described in the table indicate which of the specific clutches C1, C2, C3, C4 are engaged or actuated for each of the operating modes. Additionally, in various transmission operating modes, MG-A and MG-B may each operate as electrical motors to generate motive torque, or as a generator to generate electrical energy. A first continuously variable mode, or gear train, is selected when the torque transfer device 70 is actuated in order to "ground" the outer gear member 46 of the third planetary gear set 28. A second continuously variable mode, or gear train, is selected when the clutch C1 70 is released and the clutch C2 62 is simultaneously actuated to connect the shaft 60 to the carrier 52 of the third planetary gear set 28. Other factors outside the scope of the invention affect when MG-A and MG-B 56, 72 operate as motors and generators, and are not discussed herein.

The control system, depicted primarily in FIG. 2, is operable to provide a range of transmission output speeds, $N_O$, of shaft 64 from relatively slow to relatively fast within each mode of operation. The combination of two modes with a slow-to-fast output speed range in each mode allows the transmission 10 to propel the vehicle from a stationary condition to highway speeds, and meet various other requirements as previously described. Additionally, the control system coordinates operation of the transmission 10 so as to allow synchronized shifts between the modes.

Figure 3:
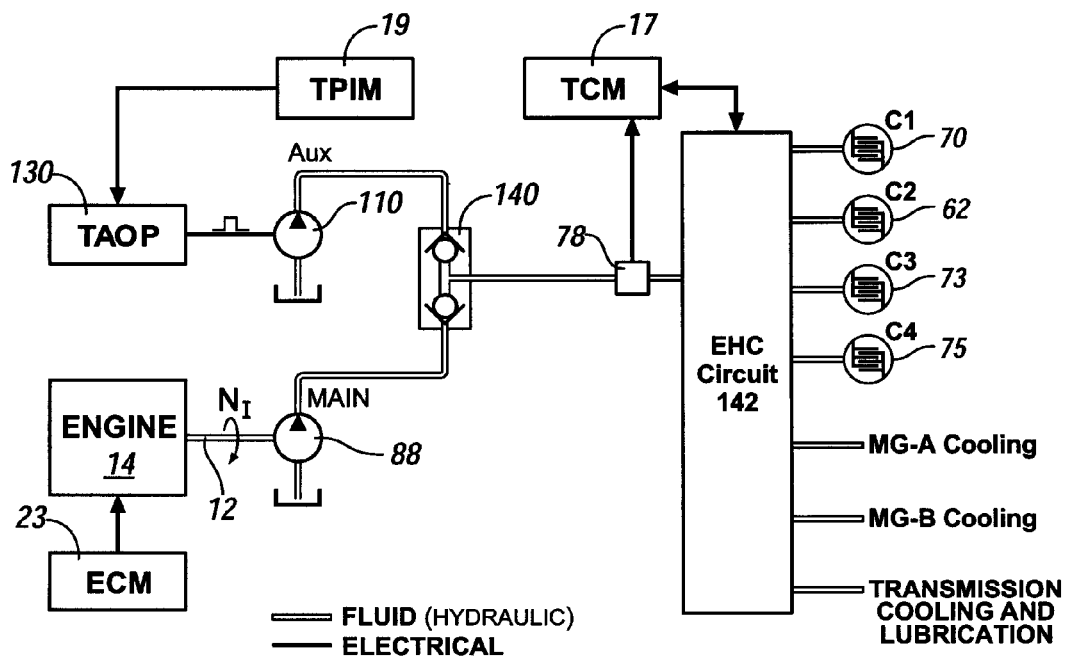
FIG. 3 is a schematic diagram of an aspect of the exemplary control architecture and powertrain, in accordance with the present invention.
Figure 4:
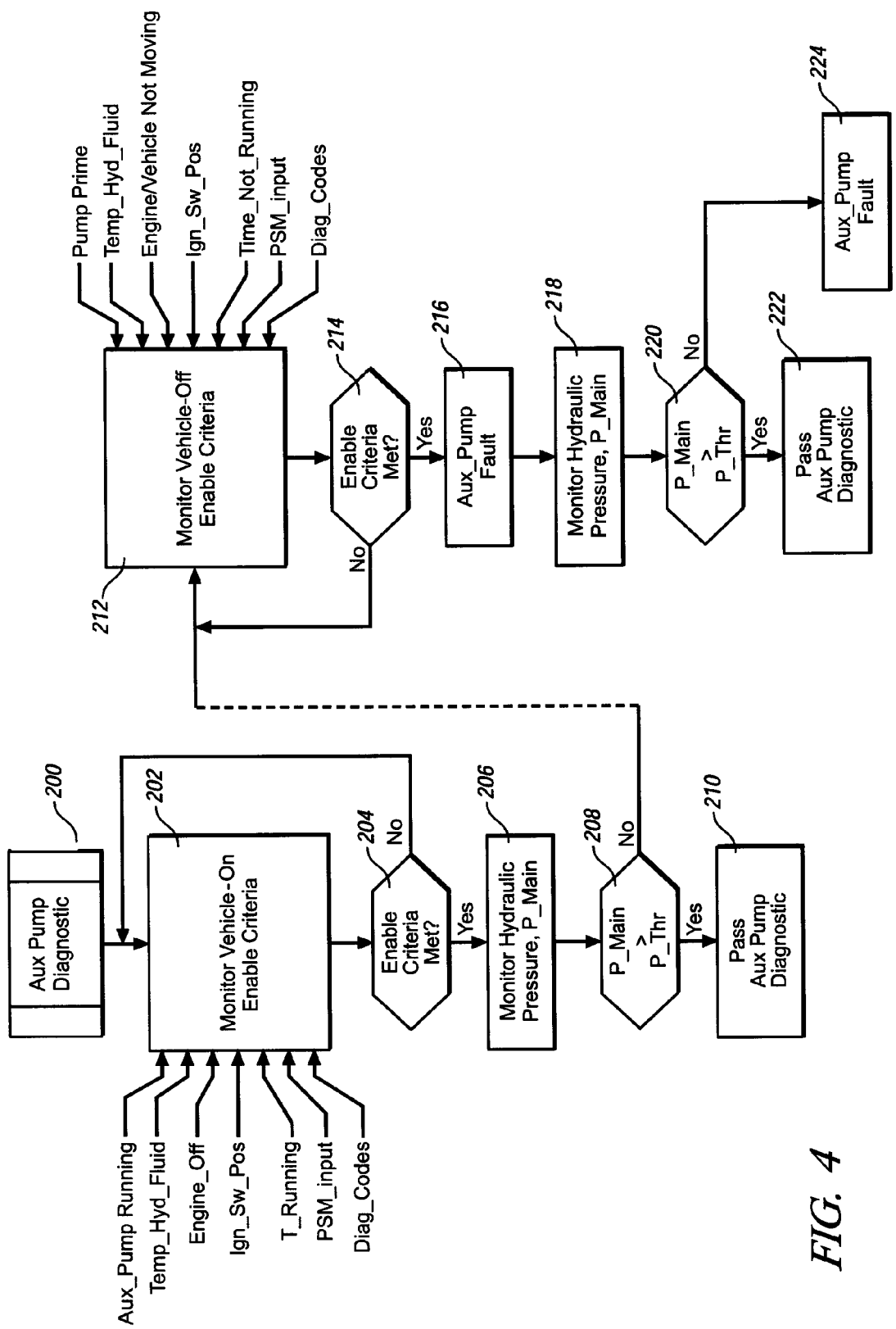
FIG. 4 is an algorithmic flowchart, in accordance with the present invention.

Referring now to FIGS. 3 and 4, operation of the exemplary powertrain and control system is now described, including a method and control system to monitor operation of the auxiliary hydraulic pump 110 operative to supply pressurized fluid to the hydraulic circuit 142. The method includes monitoring vehicle operation to determine that various enable criteria are met, and passively monitoring pressure in the hydraulic circuit. Subsequently, the pressure in the hydraulic circuit is intrusively monitored, if necessary. The control system is operable to determine the hydraulic pump is functioning properly when the monitored pressure in the hydraulic circuit exceeds a predetermined threshold. This is now described in detail.

Referring again to FIG. 3, a schematic diagram is depicted which provides a more detailed description of an exemplary hydraulic fluid circuit in the exemplary transmission, including monitoring operation the auxiliary hydraulic pump 110. The schematic diagram of the hydraulic circuit depicted is meant to be illustrative, to facilitate understanding of the invention. The auxiliary pump 110 is operatively controlled by TAOP 130, which is operatively controlled by the TPIM 19. The auxiliary pump 110 preferably comprises an electrically-powered pump of an appropriate size and capacity to provide sufficient flow of pressurized hydraulic fluid into the hydraulic system when operational. The TPIM preferably generates an output comprising a pulse-width-modulated signal of fixed frequency having a duty cycle which varies from a low value to high value, depending upon the desired output from the pump. The pump 110 receives the signal and pumps hydraulic fluid drawn from the sump into the hydraulic circuit which flows to control valve 140. The control valve is preferably mechanized to control flow of hydraulic fluid from the auxiliary pump 110 and the main pump 88 by permitting flow of pressurized fluid into the hydraulic circuit 142 of the transmission. Specific design details of a flow control valve and selection of an embodiment for the flow control valve fall outside the scope of this invention. The pressurized hydraulic fluid flows into the hydraulic circuit 142 of the transmission, which selectively distributes pressurized fluid to a plurality of devices, depicted herein to include such components as clutches C1 70, C2 62, C3 73, and C4 75, cooling circuits for machines A and B, and a circuit for cooling and lubricating the transmission 10. Flow of hydraulic fluid to each of the aforementioned devices and circuits is effected through actuation of fluid control valves of the hydraulic circuit, controlled by the TCM 17.

A pressure monitoring device 78 is operative to monitor main pressure in the hydraulic circuit, P_Main. The pressure monitoring device 78 preferably comprises a known pressure switch device having a discrete output comprising either a digital "1" signal, or a digital "0" signal, depending upon whether the applied pressure is greater than or less than a pre-calibrated threshold pressure (P_Thr). The pre-calibrated threshold pressure, P_Thr, is set at a pressure level that is sufficient to accomplish the tasks of the hydraulic circuit, and is typically driven by a pressure level necessary to effectively actuate the clutches C1 70, C2 62, C3 73, and C4 75 and permit torque transfer therethrough during ongoing operation. In this embodiment, the pre-calibrated threshold pressure, P_Thr, is set at about 400 kPa. The pressure monitoring device 78 is signally connected to the TCM 17. Alternatively, a pressure sensing device having a linear output can be used in the system to achieve the same monitoring operation described herein.

Referring now to FIG. 4, a control scheme 200 is depicted for executing a strategy to monitor and diagnose faults in the auxiliary pump 110, executed by the control system preferably in the HCP 5 or ECM 14 as one or more algorithms with preset calibration values. Actions executed as part of the control scheme 200 which are described with reference to Blocks 202, 204, 206, 208, and 210 comprise a passive test, wherein the control scheme monitors enable criteria during ongoing operation of the vehicle, monitors hydraulic pressure when the enable criteria are met, and decides whether the hydraulic pressure in the circuit exceeds a threshold. Actions executed as part of the control scheme which are described with reference to Blocks 212, 214, 216, 218, 220, 222, and 224 comprise an active test, wherein the control scheme monitors enable criteria, actuates the auxiliary hydraulic pump 110 and monitors hydraulic pressure when the enable criteria are met, and decides whether the hydraulic pressure in the circuit exceeds the pre-calibrated threshold pressure, P_Thr.

The passive test comprises monitoring hydraulic pressure when the hydraulic pump is selectively actuated and the vehicle is in a key-on, engine-off mode and the monitored vehicle operations have met a first set of predetermined criteria. The passive test begins by monitoring operating conditions to determine whether conditions exist to permit running the test, as determined by the predetermined criteria. Monitored enable criteria, described with reference to Block 202, preferably include determining the auxiliary pump 110 is running (Aux_Pump_Running), the hydraulic fluid temperature (Temp_Hyd_Fluid) is within an allowable range, determining the engine is off (Engine_Off), monitoring the ignition switch position (Ign_Sw_Pos) to determine the ignition switch is ON, determining running time (T_Running) since the ignition switch was turned on, monitoring the pressure switch input (PSM_input), and monitoring presence of relevant diagnostic codes (Diag_Codes). With regard to auxiliary pump running, the control scheme is seeking to determine that the auxiliary pump has been commanded to operate. With regard to the hydraulic fluid temperature, the control scheme is seeking to determine that the hydraulic fluid temperature is within a range of operating temperatures between a maximum temperature value and a minimum temperature value, each determinable during vehicle calibration. With regard to engine off, the control scheme is seeking to determine that the engine is not running, so the engine is unable to provide input to the main hydraulic pump 88. With regard to the ignition switch position the control scheme is seeking to ensure that the ignition switch is ON, enabling vehicle operation. With regard to running time, the control scheme is seeking to ensure that the auxiliary pump has had sufficient operating time to generate hydraulic pressure in the system. With regard to the pressure switch output from device 78, the control scheme is seeking to ensure that the pressure switch 78 is functioning properly. With regard to the presence of diagnostic codes, the control scheme is seeking to ensure that there are no other diagnostic codes that preclude running this monitoring scheme, e.g. codes related to faults in pressure switches, pressure sensors, solenoids and other devices of the EHC circuit 142.

When the enable criteria are met (Block 204), pressure in the hydraulic circuit, P_main, is monitored, preferably using the pressure switch device 78 (Block 206), and compared to threshold, P_Thr, in this embodiment (Block 208). When the pressure in the hydraulic circuit is greater than the threshold, P_thr, typically in the range of 400 kPa, it is determined that the auxiliary pump 110 has met the requirements of the test, i.e., it is working as intended, and the control scheme records the test as a 'pass' (Block 210). When the pressure in the hydraulic circuit is not greater than the threshold, P_thr, it is determined that the auxiliary pump 110 has not met the requirements of the test, the control scheme records the result, and enables the active test.

The active test comprises monitoring hydraulic pressure when the hydraulic pump is selectively actuated and the vehicle is in a key-off, engine-off mode and the monitored vehicle operations have met a second set of predetermined criteria. The active test begins by monitoring operating conditions to determine whether conditions exist to permit running the test, as determined by the second set predetermined criteria. Monitored enable criteria, described with reference to Block 212, preferably include pump prime (Pump_Prime), the hydraulic fluid temperature (Temp_Hyd_Fluid), engine/vehicle not moving (Engine/vehicle_Not_Moving), the ignition switch position (Ign_Sw_Pos), vehicle-off time (T_Not_Running), pressure switch input (PSM_input), and presence of diagnostic codes (Diag_Codes). With regard to the pump prime, the control scheme is seeking to determine that the auxiliary pump has not been commanded to a pump prime operation, which can include operating the pump at an elevated voltage level and thus can skew results of the test. With regard to the hydraulic fluid temperature, the control scheme is seeking to determine that the hydraulic fluid temperature is within a range of operating temperature between a maximum value and a minimum value, each determinable during vehicle calibration. With regard to engine/vehicle not moving, the control scheme is seeking to determine that the engine and the vehicle are not running or moving, so the engine is unable to provide input to the main hydraulic pump 88. With regard to the ignition switch position the control scheme is seeking to ensure that the ignition switch is in an off-position, disabling vehicle operation. With regard to vehicle-off time, the control scheme is seeking to ensure that the vehicle has been off for an amount of time so there is no effect on the test results due to residual pressure in the hydraulic circuit. With regard to the output of pressure switch 78, the control scheme is seeking to ensure that the pressure switch 78 is functioning properly, i.e. in an allowable pressure range. With regard to the presence of diagnostic codes, the control scheme is seeking to ensure that there are no other diagnostic codes that preclude running this monitoring scheme, e.g. codes related to e.g. codes related to faults in pressure switches, pressure sensors, solenoids and other devices of the EHC circuit 142.

When the enable criteria are met (Block 214), the control scheme commands the TPIM to actuate the auxiliary pump 110, preferably for a fixed period of time (Block 216), and pressure in the hydraulic circuit, P_main, is monitored, preferably using the pressure switch device 78 (Block 218), and compared to a threshold, P_Thr (Block 220). When the pressure in the hydraulic circuit is greater than the threshold, P_thr, again typically in the range of 400 kPa, it is determined that the auxiliary pump 110 has met the requirements of the test, i.e., it is working as intended, and the control scheme records the test as a 'pass' (Block 212). Under this circumstance, the hydraulic pump is deactivated after the monitored pressure in the hydraulic circuit exceeds the threshold. When the pressure in the hydraulic circuit is not greater than the threshold, P_thr, it is determined that the auxiliary pump 110 has not met the requirements of the test, the control scheme records the result as a fault (Block 224). In either case, the test result is communicated to the control system for further action in accordance with the diagnostic monitoring system control scheme.

The monitoring system is described with reference to an embodiment comprising a vehicle employing a two-mode, compound-split, electro-mechanical transmission, but it is understood that the system is equally applicable to monitoring other systems employing both a main and an electrically-actuated auxiliary hydraulic fluid pump to supply pressurized fluid to a hydraulic circuit for a transmission device operably connected to an internal combustion engine of a vehicle. For example, the system is readily applied to a hybrid vehicle system employing a belt-alternator-starter system which is operative to selectively turn off the internal combustion engine during ongoing operation of the vehicle.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to monitor an electrically-actuated hydraulic pump selectively operative to supply pressurized fluid to a hydraulic circuit for a transmission device operably connected to an internal combustion engine of a vehicle, comprising:
   monitoring operation of the vehicle;
   passively monitoring a pressure in the hydraulic circuit;
   intrusively monitoring the pressure in the hydraulic circuit; and,
   determining the hydraulic pump is functioning properly when the monitored pressure in the hydraulic circuit exceeds a threshold.

2. The method of claim 1, further comprising identifying presence of a fault related to the hydraulic circuit when the monitored pressure in the hydraulic circuit does not exceed the threshold.

3. The method of claim 1, wherein passively monitoring pressure in the hydraulic circuit comprises monitoring pressure in the hydraulic circuit when the electrically-actuated hydraulic pump is selectively actuated and the vehicle is in a key-on, engine-off mode and the monitored vehicle operations have met a first set of predetermined criteria.

4. The method of claim 1, wherein intrusively monitoring the pressure in the hydraulic circuit comprises monitoring pressure in the hydraulic circuit when the electrically-actuated hydraulic pump is selectively actuated.

5. The method of claim 4, further comprising monitoring pressure in the hydraulic circuit when the hydraulic pump is selectively actuated and the vehicle is in a key-off, engine-off mode and the monitored vehicle operations have met a second set of predetermined criteria.

6. The method of claim 5, further comprising deactivating the selectively actuated hydraulic pump substantially immediately after the monitored pressure in the hydraulic circuit exceeds the threshold.

7. The method of claim 1, further comprising intrusively monitoring the pressure in the hydraulic circuit only when the passively monitored pressure in the hydraulic circuit did not exceed the threshold.

8. The method of claim 1, wherein monitoring operation of the vehicle comprises monitoring a temperature of the pressurized fluid, an elapsed time, a position of an ignition switch, and, a presence of diagnostic codes.

9. Article of manufacture, comprising a storage medium having a computer program encoded therein for controlling a powertrain system comprising an engine operatively connected to a transmission, the transmission having a main hydraulic pump and an electrically-actuated selectively-operative hydraulic pump, each pump operative to supply hydraulic fluid to a hydraulic circuit of the transmission, the computer program comprising:
  code for monitoring operation of the vehicle;
  code for passively monitoring a pressure in the hydraulic circuit;
  code for intrusively monitoring the pressure in the hydraulic circuit; and,
  code for determining at least one of the hydraulic pumps is functioning properly when the monitored pressure in the hydraulic circuit exceeds a threshold.

10. The article of manufacture of claim 9, wherein the code for passively monitoring pressure in the hydraulic circuit comprises code for monitoring pressure when the electrically-actuated hydraulic pump is operating and the vehicle is in a key-on, engine-off mode and the monitored vehicle operations have met a first set of predetermined criteria.

11. The article of manufacture of claim 10, wherein the code for intrusively monitoring the pressure in the hydraulic circuit comprises code for monitoring the pressure when the electrically-actuated hydraulic pump is operating and the vehicle is in a key-off, engine-off mode and the monitored vehicle operations have met a second set of predetermined criteria.

12. The article of manufacture of claim 11, wherein the code for intrusively monitoring the pressure in the hydraulic circuit further comprises code for intrusively monitoring the pressure in the hydraulic circuit only when the passively monitored pressure in the hydraulic circuit does not exceed the threshold.

13. Control system for a vehicle, comprising:
  a powertrain, comprising an engine operatively connected to a transmission having a main hydraulic pump and an auxiliary hydraulic pump each pump operative to supply pressurized fluid to a hydraulic circuit for the transmission; and,
  a distributed control module system, adapted to execute a control scheme operative to:
    monitor operation of the vehicle;
    passively monitor a pressure in the hydraulic circuit;
    intrusively monitor the pressure in the hydraulic circuit; and,
    determine the auxiliary hydraulic pump is functioning properly when the monitored pressure in the hydraulic circuit exceeds a threshold.

14. The control system of claim 13, wherein the transmission comprises a two-mode compound-split electro-mechanical transmission having four torque transfer clutches each clutch selectively actuatable by the hydraulic circuit.

15. The control system of claim 14, further comprising the control system operative to selectively actuate the four torque transfer clutches to selectively operate the transmission in one of four fixed gears and two electrically variable modes.

16. The control system of claim 13, wherein the main hydraulic pump is operatively actuated by an input shaft from the engine.

17. The control system of claim 13, wherein the auxiliary pump comprises an electrically-driven pump operatively controlled by a control module of the distributed control module system.

* * * * *